(12) United States Patent
Ledford et al.

(10) Patent No.: US 8,092,310 B2
(45) Date of Patent: Jan. 10, 2012

(54) PROPSHAFT ASSEMBLY WITH UNIVERSAL JOINT HAVING NON-CONDUCTIVE SLEEVE BETWEEN YOKE AND BEARING CUP

(75) Inventors: Kevin M Ledford, Macomb, MI (US); John D Overholt, Windsor (CA); Bruce A Duncan, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 341 days.

(21) Appl. No.: 12/356,202

(22) Filed: Jan. 20, 2009

(65) Prior Publication Data

US 2010/0113165 A1 May 6, 2010

Related U.S. Application Data

(63) Continuation-in-part of application No. 12/264,733, filed on Nov. 4, 2008, now abandoned.

(51) Int. Cl.
*F16D 3/40* (2006.01)
(52) U.S. Cl. .......................................... 464/128; 464/900
(58) Field of Classification Search .......... 464/128–130, 464/136, 900, 902, 903, 132; 384/126–128, 384/907.1
See application file for complete search history.

(56) References Cited

U.S. PATENT DOCUMENTS

| | | |
|---|---|---|
| 3,241,336 A | 3/1966 | Nemtsov |
| 3,545,232 A | 12/1970 | Neece et al. |
| 3,662,569 A | 5/1972 | Williams |
| 4,482,337 A | 11/1984 | Petrzelka |
| 4,997,293 A * | 3/1991 | Ono et al. |
| 5,163,877 A * | 11/1992 | Marpert et al. |
| 5,865,363 A | 2/1999 | Barrett et al. |
| 6,102,807 A | 8/2000 | Barrett et al. |
| 6,162,126 A | 12/2000 | Barrett et al. |
| 6,280,335 B1 | 8/2001 | Wehner et al. |
| 6,336,868 B1 | 1/2002 | Kurecka et al. |
| 6,520,859 B2 * | 2/2003 | Beitzel et al. .................. 464/903 |
| 6,662,423 B2 | 12/2003 | Menosky et al. |
| 6,685,569 B2 | 2/2004 | Kurzeja et al. |

(Continued)

FOREIGN PATENT DOCUMENTS

FR 891.244 * 3/1944

(Continued)

OTHER PUBLICATIONS

Wagner et al, "Cardan or Hooke Universal Joint," Universal Joint and Driveshaft Design Manual, AE-7, Society of Automotive Engineers, Inc., Warrendale, PA, pp. 39 & 62, TJ1079.S62 1979.*

(Continued)

*Primary Examiner* — Gregory Binda
(74) *Attorney, Agent, or Firm* — Harness, Dickey & Pierce, P.L.C.

(57) ABSTRACT

A propshaft having first and second universal joints. The first universal joint has a first joint member, which is fixedly coupled to a first end of the shaft member, and a second joint member that is pivotally coupled to the first joint member. The second universal joint has a third joint member, which is fixedly coupled to a second end of the shaft member opposite the first end, and a fourth joint member that pivotally coupled to the third joint member. At least one of the second joint member and the fourth joint member is electrically insulated from the shaft member.

2 Claims, 6 Drawing Sheets

U.S. PATENT DOCUMENTS

| | | |
|---|---|---|
| 6,814,668 B2 | 11/2004 | Grupido |
| 6,821,207 B2 | 11/2004 | Bommarito et al. |
| 6,827,649 B2 | 12/2004 | Menosky et al. |
| 6,837,795 B2 | 1/2005 | Menosky et al. |
| 6,855,059 B2 | 2/2005 | Menosky et al. |
| 6,874,228 B2 | 4/2005 | Armitage et al. |
| 6,881,151 B1 | 4/2005 | Jantz et al. |
| 6,893,350 B2 | 5/2005 | Menosky et al. |
| 6,994,627 B2 | 2/2006 | Menosky et al. |
| 7,004,841 B2 | 2/2006 | Bommarito et al. |
| 7,025,679 B2 | 4/2006 | Menosky et al. |
| 7,044,859 B2 | 5/2006 | Menosky et al. |
| 7,140,969 B2 | 11/2006 | Prucher |
| 7,189,162 B2 | 3/2007 | Menosky et al. |
| 7,201,663 B2 | 4/2007 | Menosky |
| 7,278,212 B2 | 10/2007 | Bommarito |
| 7,289,752 B2 * | 10/2007 | Yamazaki et al. |
| 7,347,785 B2 | 3/2008 | Worman, Jr. et al. |
| 7,367,890 B2 | 5/2008 | Zhou et al. |
| 7,445,554 B2 | 11/2008 | Gross et al. |
| 7,445,555 B2 | 11/2008 | Gross et al. |
| 2008/0161117 A1 * | 7/2008 | Riahi et al. .................... 464/128 |

FOREIGN PATENT DOCUMENTS

| | | |
|---|---|---|
| JP | 61-170721 U | 10/1986 |
| JP | 2003-294053 A | 10/2003 |
| JP | 2004-332752 A | 11/2004 |

OTHER PUBLICATIONS

International Search Report for International Patent Application No. PCT/US2009/061875, dated Jun. 10, 2010.

* cited by examiner

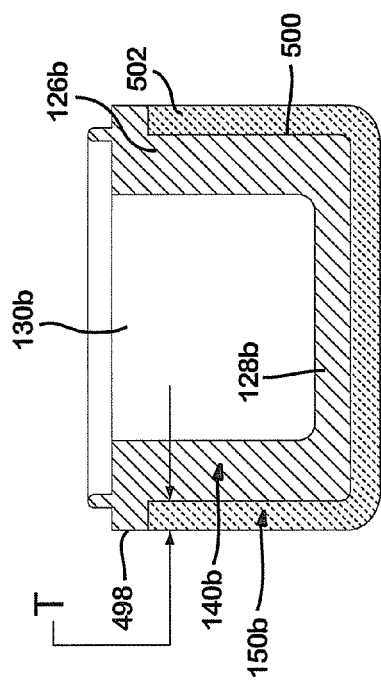
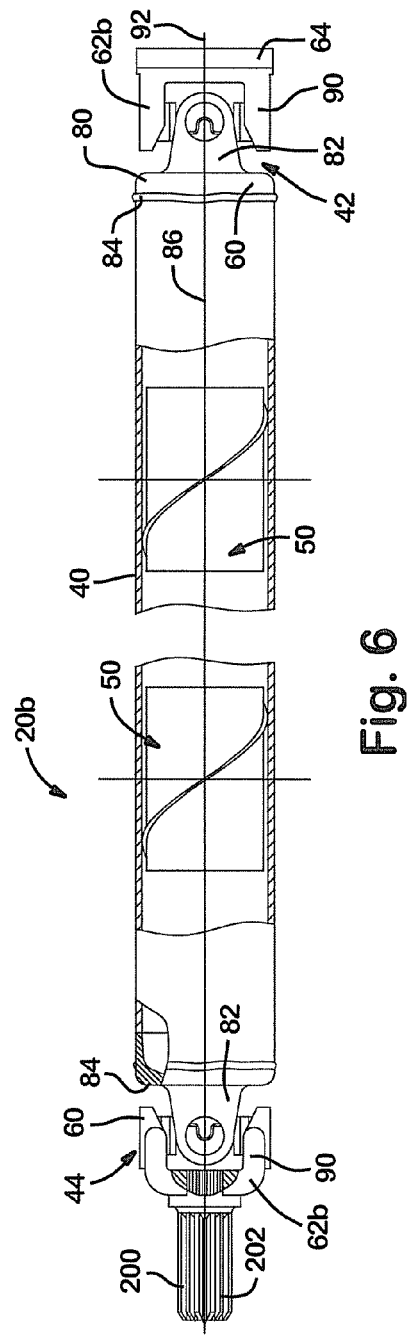
Fig. 8
Fig. 6

PROPSHAFT ASSEMBLY WITH UNIVERSAL JOINT HAVING NON-CONDUCTIVE SLEEVE BETWEEN YOKE AND BEARING CUP

CROSS-REFERENCE TO RELATED APPLICATIONS

This application is a continuation-in-part of U.S. patent application Ser. No. 12/264,733, which was field on Nov. 4, 2008, now abandoned. The disclosure of the aforementioned patent application is hereby incorporated by reference as if fully set forth in its/their entirety herein.

INTRODUCTION

The present invention generally relates to a propshaft assembly with a universal joint having a non-conductive sleeve between a yoke and a bearing cup.

As is well known, propshaft assemblies are used in motor vehicle driveline applications for interconnecting a pair of rotary shafts in a manner that permits a change in the angularity therebetween. Most conventional automotive propshafts include universal joints having a pair of bifurcated yokes which are secured to the shafts and which are interconnected by a spider or cruciform for rotation about independent axes. The spider includes four orthogonal trunions with each opposing pair of axially aligned trunions mounted in a pair of aligned bores formed in the bifurcated yokes. Typically, a bearing cup is secured in each bore and a bearing assembly is retained in the bearing cup such that each yoke is supported for pivotal movement relative to a pair of trunions.

In some situations, it can be possible for the propshaft to participate with other vehicle components to form a transmission path for electrical energy between the transmission and an axle assembly. There remains a need in the art for propshaft that is resistant to the transmission of electrical energy.

SUMMARY

This section provides a general summary of some aspects of the present disclosure and is not a comprehensive listing or detailing of either the full scope of the disclosure or all of the features described therein.

In one form, the present teachings provide a propshaft having first and second universal joints. The first universal joint has a first joint member, which is fixedly coupled to a first end of the shaft member, and a second joint member that is pivotally coupled to the first joint member. The second universal joint has a third joint member, which is fixedly coupled to a second end of the shaft member opposite the first end, and a fourth joint member that pivotally coupled to the third joint member. At least one of the second joint member and the fourth joint member is electrically insulated from the shaft member.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

FIG. 6 is a side elevation view in partial section of a portion of another propshaft assembly constructed in accordance with the teachings of the present disclosure;

FIG. 8 is a sectional view of a portion of the propshaft assembly of FIG. 6 illustrating a bearing cup and an insulator in detail.

DETAILED DESCRIPTION OF THE VARIOUS EMBODIMENTS

Figure 1:
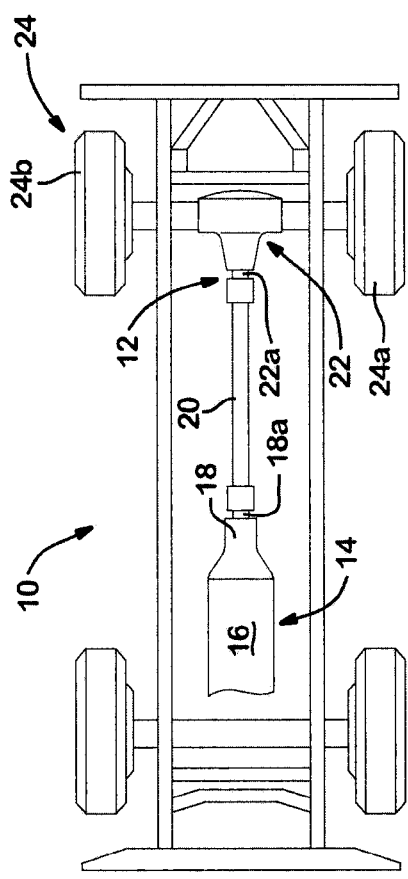
FIG. 1 is a schematic illustration of a vehicle having a propshaft assembly constructed in accordance with the teachings of the present disclosure.

With reference to FIG. 1 of the drawings, a vehicle having a propshaft assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft assembly 20, a rear axle assembly 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft assembly 20 can be coupled for rotation with the output of the transmission 18. Drive torque can be transmitted through the propshaft assembly 20 to the rear axle assembly 22 where it can be selectively apportion in a predetermined manner to the left and right rear wheels 24*a* and 24*b*, respectively.

Figure 2:
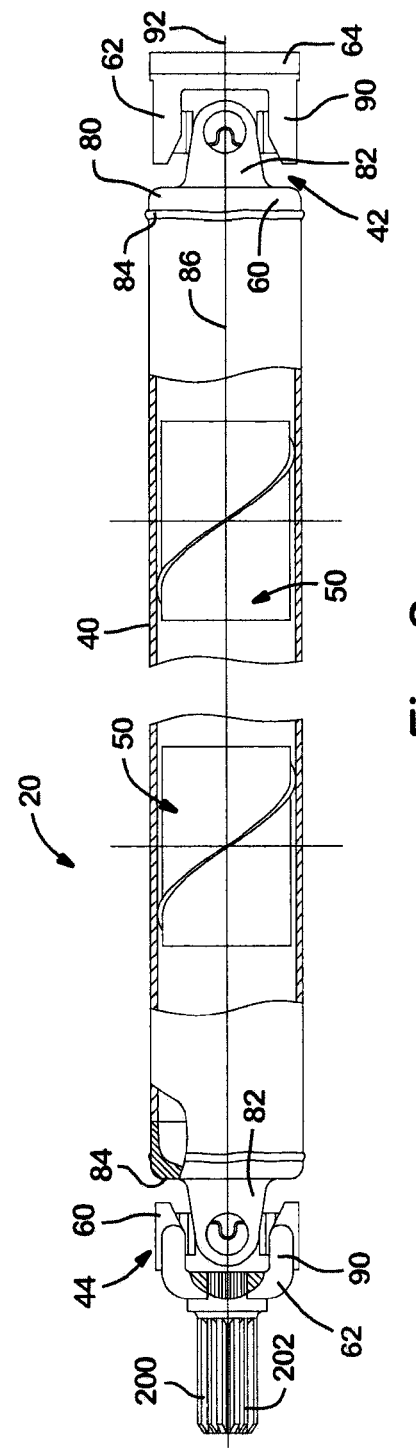
FIG. 2 is a side elevation view in partial section of the propshaft assembly of FIG. 1.
Figure 3:
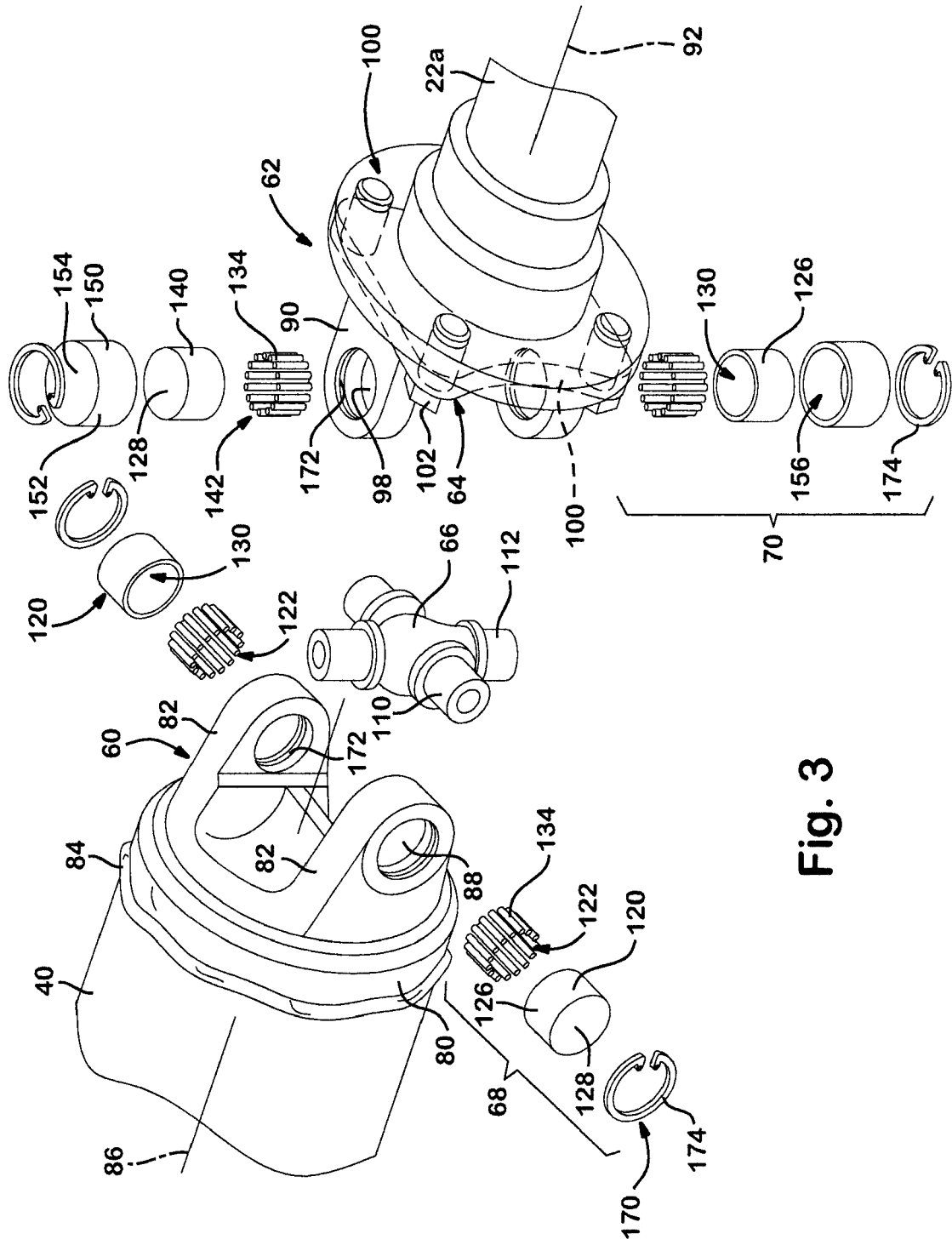
FIG. 3 is an exploded perspective view of a portion of the propshaft assembly of FIG. 1 illustrating a first joint assembly in detail.

With reference to FIGS. 2 and 3, the propshaft assembly 20 can include a shaft member 40, a first joint assembly 42 and a second joint assembly 44. The shaft member 40 can be formed of an appropriate structural material, such as a tubular steel or aluminum material, and can be equipped with one or more inserts and/or one or more liners 50 to attenuate one or more types of vibrations (e.g., bending mode, shell mode). The shaft member 40 can be sized to transmit a predetermined amount of torque to facilitate propulsion of an automotive vehicle, such as at least about 1000 Nm.

The first joint assembly 42 can include a first yoke member 60, a second yoke member 62, a first coupling 64, a spider 66, a pair of first bearing assemblies 68 and a pair of second bearing assemblies 70.

The first yoke member 60 can include a first coupling portion 80 and a pair of first arms 82. The first coupling portion 80 can be configured to be fixedly coupled to the shaft member 40, such as through a weld 84. The first arms 82 can be disposed about a rotational axis 86 of the first yoke member 60. A first bearing aperture 88 can be formed through each of the first arms 82 in a direction that is generally perpendicular to the rotational axis 86 of the first yoke member 60.

The second yoke member 62 can include a pair of second arms 90 that can be disposed about a rotational axis 92 of the second yoke member 62. A second bearing aperture 98 can be formed through each of the second arms 90 in a direction that is generally perpendicular to the rotational axis 92 of the second yoke member 62. A diameter of the second bearing apertures 98 can be greater than a diameter of the first bearing apertures 88.

The first coupling 64 can be fixedly coupled to the second yoke member 62 and can be configured to be coupled to the input pinion 22a of the rear axle assembly 22 (FIG. 1) in a conventional manner. For example, the first coupling 64 and the input pinion 22a can include flanges 100 that can be coupled to one another via a plurality of threaded fasteners 102. It will be appreciated, however, that other types of coupling systems can be employed to couple the first joint assembly 42 to a first shaft and as such, the first coupling 64 can be configured in any appropriate manner in accordance with such coupling systems.

The spider 66 can be conventional in its construction and can include first and second pairs of trunions 110 and 112, respectively, that can be disposed along axes that are generally perpendicular to one another and orthogonal to the rotational axes 86 and 92 of the first and second yoke members 60 and 62.

Each of the first bearing assemblies 68 can include a bearing cup 120 and a bearing set 122. The bearing cup 120 can be formed of metal and can include an annular side wall 126 and an end wall 128 that can cooperate with the annular side wall 126 to form a bearing cavity 130. The bearing set 122 can comprise a plurality of roller bearings 134.

Each of the second bearing assemblies 70 can include a bearing cup 140, a bearing set 142 and an insulator 150. In the particular example provided, the bearing cup 140 and the bearing set 142 are identical to the bearing cup 120 and the bearing set 122 employed in the first bearing assemblies 68. Each of the insulators 150 can be generally cup-shaped and can include an annular wall 152 and an end wall 154 that can cooperate to form an insulator cavity 156. In the particular example provided, the end wall 154 completely closes one side of the insulator 150, but it will be appreciated that the end wall 154 could have an annular configuration so that a portion of the end wall 154 is open. The insulators 150 can be formed of an electrically insulating material, such as a polymeric and/or ceramic material. Examples of suitable polymeric materials include polyimide, such as VESPEL® SP-1 manufactured by E.I. DuPont de Nemours and Company. Examples of suitable ceramic materials include aluminum oxide and such ceramic materials may be directly deposited onto the exterior of the bearing cups 140 of the second bearing assemblies 70.

The first pair of trunions 110 can be received into the first bearing apertures 88 in the first arms 82, while the second pair of trunions 112 can be received into the second bearing apertures 98 of the second arms 90. Each of the bearing sets 122 and 142 can be received over (and in rolling contact with) an associated one of the first and second pairs of trunions 110 and 112, respectively. Each of the bearing cups 120 and 140 can be received in an associated one of the first and second bearing apertures 88 and 98, respectively, such that the bearing sets 122 and 142, respectively, are received into the bearing cavities 130 and are in contact with an interior cylindrical surface of the annular side walls 126.

An exterior surface of the annular side wall 126 of the bearing cups 120 associated with the first bearing assemblies 68 can be abutted against the interior surfaces of the first bearing apertures 88.

The bearing cups 140 associated with the second bearing assemblies 70 can be received in the insulator cavities 156 such that the exterior surface of the annular side wall 126 of the bearing cups 140 can be abutted against the interior surfaces of the annular wall 152 of the insulators 150 and the end wall 128 of the bearing cups 140 can be abutted against the end wall 154 of the insulators 150. An exterior surface of the annular wall 152 of the insulators 150 can be abutted against the interior surfaces of the second bearing apertures 98 to thereby electrically insulate the first and second yoke members 60 and 62.

A retaining system 170 can be employed to inhibit movement of the bearing cups 120 and 140 and the insulators 150 in a radially outward manner. In the particular example illustrated, the retaining system 170 includes a plurality of retaining ring grooves 172, which can be formed into each of the first and second arms 82 and 90 about at least a portion of the first and second bearing apertures 88 and 90, and a plurality of internal retaining (snap) rings 174 that can be received into corresponding ones of the retaining ring grooves 172. It will be appreciated, however, that various other types of retaining systems can be employed, including an adhesive based retaining system such as that which is described in U.S. Pat. No. 7,278,212, the disclosure of which is hereby incorporated by reference as if fully set forth in detail herein. As such, those of skill in the art will appreciate that the particular retaining system 170 illustrated in the accompanying drawings does not limit the scope of the invention in any manner.

In the particular example provided, the insulator 150 can be sized to engage the bearing cup 140 in a line-to-line or light press-fit manner, as well as to engage the second arm 90 in a press-fit manner to thereby inhibit rotation of the insulator 150 and the bearing cup 140 relative to the second arms 90. It will be appreciated, however, that other means may be employed (additionally or alternatively) to inhibit rotation of the insulator 150 and the bearing cup 140 relative to the second arms 90. For example, the exterior surface of the annular wall 152 of the bearing cup 140 and the insulator cavity 156 of the insulator 150 can have mating, non-circular transverse cross-sections (i.e., they can be non-cylindrically shaped). In this regard, flats or other features can be employed to inhibit relative rotation between the bearing cup 140 and the insulator 150. Additionally or alternatively, an adhesive, staking and/or mechanical fasteners can be employed to secure the insulators 150 to the bearing cup 140 and/or the second arms 90.

The second joint assembly 44 can be identical to the first joint assembly 42 except that a second coupling 200 can be coupled to the second yoke member 62. The second coupling 200 can be configured to be coupled to the output shaft 18a (FIG. 1) of the transmission 18 (FIG. 1) in a conventional manner. For example, one of the output shaft 18a (FIG. 1) and the second coupling 200 can include a male splined shaft 202 that can be configured to be matingly received into a female splined aperture (not specifically shown) formed in the other one of the output shaft 18a (FIG. 1) and the second coupling 200. It will be appreciated, however, that other types of coupling systems can be employed to couple the second joint assembly 44 to a second shaft and as such, the second coupling 200 can be configured in any appropriate manner in accordance with such coupling systems.

Figure 4:
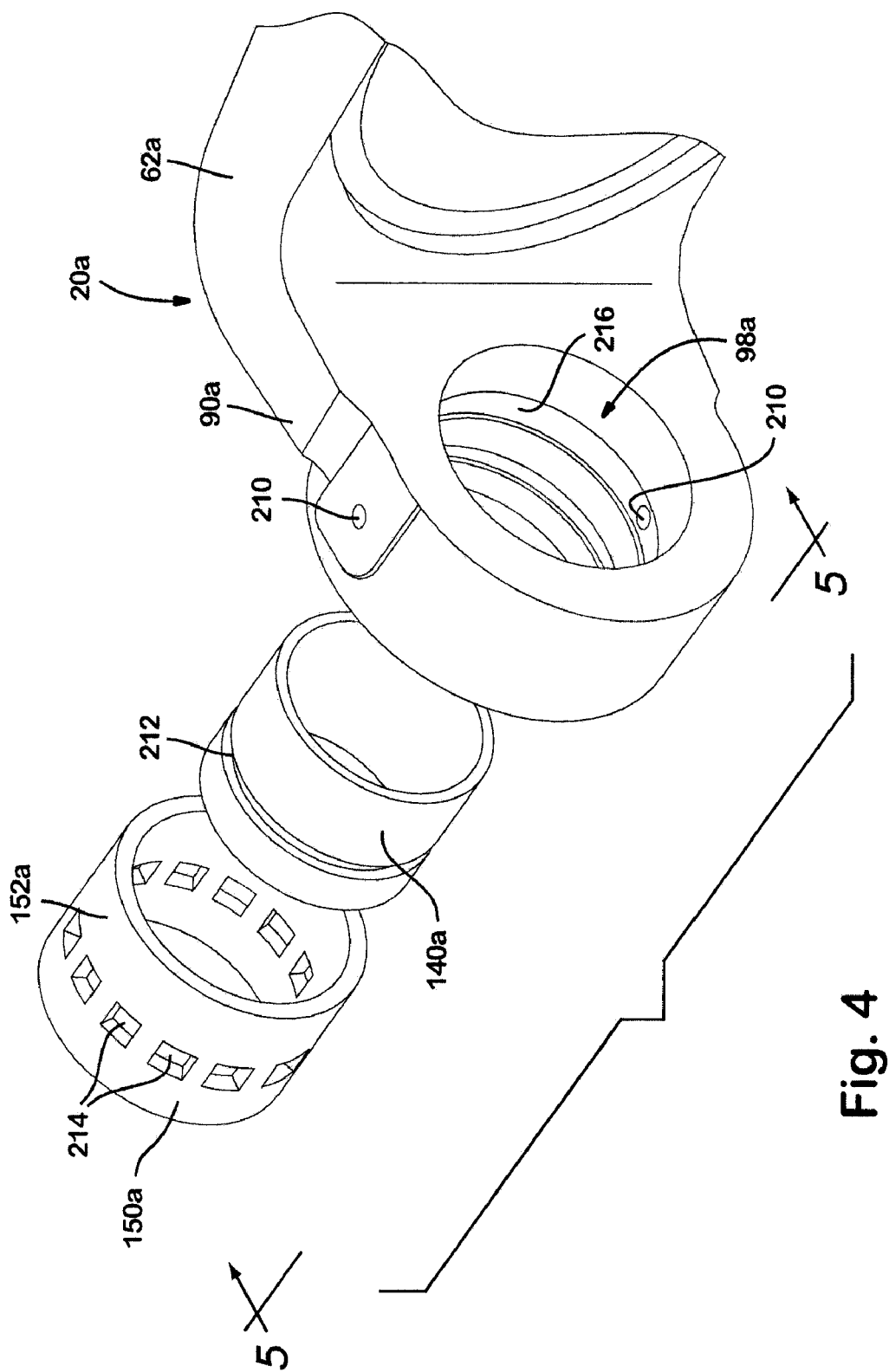
FIG. 4 is an exploded perspective view of a portion of another propshaft assembly constructed in accordance with the teachings of the present disclosure.
Figure 5:
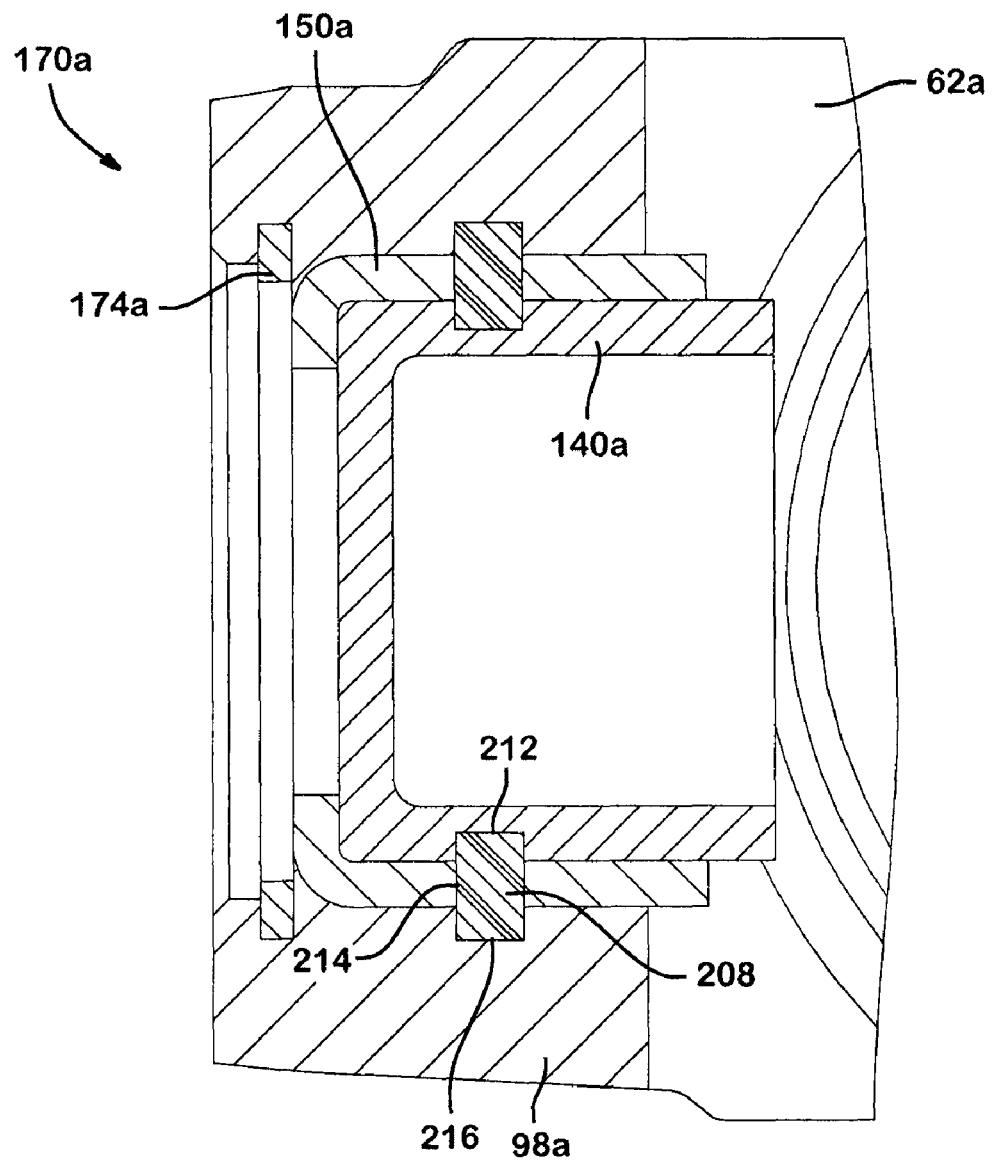
FIG. 5 is a sectional view taken along the line 5-5 of FIG. 4.

With reference to FIGS. 4 and 5, a portion of an alternatively constructed propshaft assembly 20a is illustrated in which the second yoke member 62a, the bearing cup 140a, the insulator 150a and the retaining system 170a are different from that which is illustrated in FIG. 2 and described above. In addition to the snap rings 174, the retaining system 170a can employ an adhesive 208 for coupling the bearing cup 140a to the insulator 150a. To facilitate the use of an adhesive, the second yoke member 62a can include one or more adhesive apertures 210, which can be formed through the second arms 90a generally orthogonal to the rotational axis 92 (FIG. 3) of the second yoke member 62a and axis of the second bearing apertures 98a, an adhesive groove 212 formed in the annular side wall 126a of the bearing cup 140a and one or more apertures 214 can be formed through the annular wall 152a of the insulator 150a. Optionally, a circumferentially-extending groove 216 can be formed concentric with the second bearing apertures 98a and can intersect the adhesive apertures 210. The adhesive 208 can be injected into one (or more) of the adhesive apertures 210. The adhesive 208 can flow in the space between the second arm 98a and the insulator 150a (e.g., around the grooves 216 in the second arms 92a if so configured), through the apertures 214 in the insulator 150 and into the groove 212 in the bearing cup 140a. Once cured, the adhesive 208 can mechanically lock the bearing cup 140a to the insulator 150a, even if the adhesive 208 does not bond to either of the bearing cup 140a or the insulator 150a.

Figure 7:
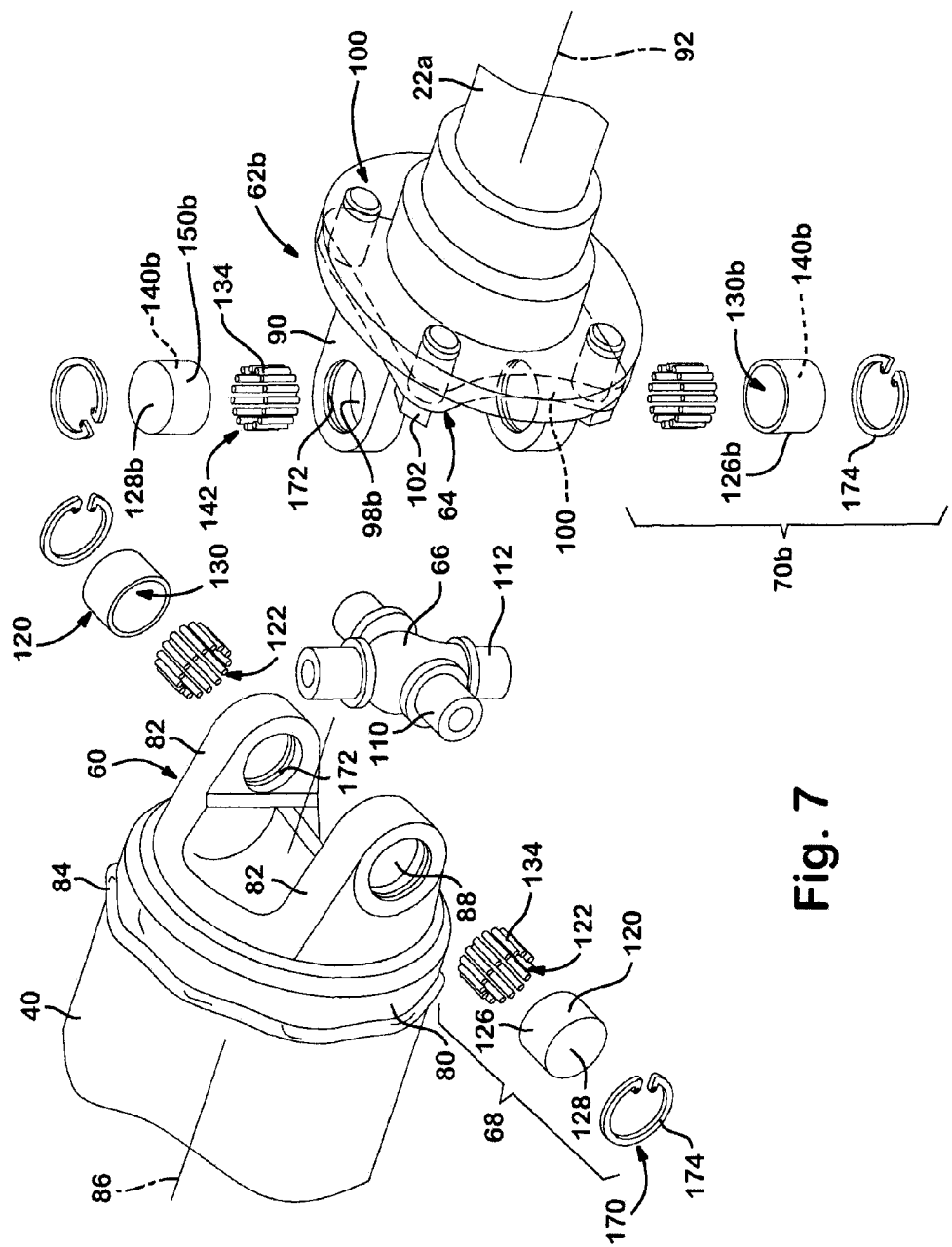
FIG. 7 is an exploded perspective view of a portion of the propshaft assembly of FIG. 6 illustrating a first joint assembly in detail.

With reference to FIGS. 6 through 8, a portion of another propshaft assembly 20b constructed in accordance with the teachings of the present disclosure is illustrated. The propshaft assembly 20b can be similar to the propshaft assembly 20 of FIG. 1 except for the configuration of the second yoke member 62b and the second bearing assemblies 70b as is described in detail below.

The second yoke member 62b can include a pair of second arms 90 that can be disposed about a rotational axis 92 of the second yoke member 62b. A second bearing aperture 98b can be formed through each of the second arms 90 in a direction that is generally perpendicular to the rotational axis 92 of the second yoke member 62. A diameter of the second bearing apertures 98b can be equal to a diameter of the first bearing apertures 88.

Each of the second bearing assemblies 70b can include a bearing cup 140b, a bearing set 142 and an insulator 150b. In the particular example provided, the bearing set 142 is identical to the bearing set 122 employed in the first bearing assemblies 68.

The bearing cup 140b can be formed of metal and can include an annular side wall 126b and an end wall 128b that can cooperate with the annular side wall 126b to form a bearing cavity 130b. Unlike the annular side wall 126b of the bearing cup 120 that is associated with the first bearing assembly 68, the annular side wall 126b has first portion 498 and a second portion 500. The first portion 498 can have a diameter that is consistent with the diameter of the annular side wall 126 of the bearing cup 120, while the second portion 500 can have a diameter that is somewhat smaller than that of the first portion 498. A shoulder 502 can be formed where the first and second portions 498 and 500 intersect one another. The insulator 150b can be a ceramic coating, such as aluminum oxide that can be formed onto the second portion 500 and, if desired, the end wall 128b via a conventional ceramic coating procedure. The insulator 150b can have a thickness T that is equal to or somewhat greater than the radial step between the first portion 498 and the second portion 500. The thickness T can be greater than 0.002 inch, but in the particular example provided, the thickness is 0.010 inch. Construction in this manner is advantageous in that the second yoke member 62b need not be a specially manufactured item.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A propshaft assembly comprising:
   a shaft member; and
   a universal joint coupled to a first end of the shaft member, the universal joint having a first yoke member, a second yoke member, a spider, a pair of first bearings and a pair of second bearings, each of the first and second yoke members including a pair of arms, each of the arms having an identically sized bearing aperture formed therethrough, the spider including a plurality of trunions, each of the trunions being received in a corresponding one of the bearing apertures, the first bearings being received in the bearing apertures in the arms of the first yoke member, each of the first bearings being disposed between an associated arm of the first yoke and a corresponding one of the trunions to rotatably mount the first yoke member to the spider, each of the second bearings being received in the bearing apertures in the arms of the second yoke member, each of the second bearings being disposed between an associated arm of the second yoke and a corresponding one of the trunions to rotatably mount the second yoke member to the spider;
   wherein each of the first bearings, each of the second bearings or all of the first and second bearings include a bearing housing, which is received about an associated one of the trunions, a bearing set that is disposed between the associated one of the trunions and the bearing housing, and an insulator that is disposed between the bearing housing and an associated arm, the insulator being formed of a ceramic material.

2. A propshaft assembly comprising:
   a shaft member; and
   a universal joint coupled to a first end of the shaft member, the universal joint having a first yoke member, a second yoke member, a spider, a pair of first bearings and a pair of second bearings, each of the first and second yoke members including a pair of arms, each of the arms having a bearing aperture formed therethrough, the spider including a plurality of trunions, each of the trunions being received in a corresponding one of the bearing apertures, the first bearings being received in the bearing apertures in the arms of the first yoke member, each of the first bearings being disposed between an associated arm of the first yoke and a corresponding one of the trunions to rotatably mount the first yoke member to the spider, each of the second bearings being received in the bearing apertures in the arms of the second yoke member, each of the second bearings being disposed between an associated arm of the second yoke and a corresponding one of the trunions to rotatably mount the second yoke member to the spider;

wherein each of the first bearings, each of the second bearings or all of the first and second bearings include a bearing housing, which is received about an associated one of the trunions, a bearing set that is disposed between the associated one of the trunions and the bearing housing, and an insulator that is disposed between the bearing housing and an associated arm;

wherein the insulator is formed of a ceramic material.

* * * * *

UNITED STATES PATENT AND TRADEMARK OFFICE
CERTIFICATE OF CORRECTION

PATENT NO.           : 8,092,310 B2                              Page 1 of 1
APPLICATION NO.      : 12/356202
DATED                : January 10, 2012
INVENTOR(S)          : Kevin M. Ledford et al.

It is certified that error appears in the above-identified patent and that said Letters Patent is hereby corrected as shown below:

On the title page item (75), line 4,
    Add inventor --Michael Voight, Troy, MI (US)--, therefor Signed and Sealed this
Twenty-second Day of March, 2016

Michelle K. Lee
*Director of the United States Patent and Trademark Office*